(12) United States Patent
Maeda et al.

(10) Patent No.: US 8,727,537 B2
(45) Date of Patent: May 20, 2014

(54) IMAGE PROJECTION APPARATUS AND COLOR SEPARATION/COMBINATION OPTICAL SYSTEM

(75) Inventors: Yuuki Maeda, Utsunomiya (JP); Yu Yamauchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 13/153,149

(22) Filed: Jun. 3, 2011

(65) Prior Publication Data
US 2011/0310350 A1 Dec. 22, 2011

(30) Foreign Application Priority Data

Jun. 16, 2010 (JP) .................................. 2010-137471
Apr. 1, 2011 (JP) .................................. 2011-081975

(51) Int. Cl.
*G03B 21/14* (2006.01)
*G03B 21/28* (2006.01)
*G02B 5/30* (2006.01)
*G02B 27/28* (2006.01)

(52) U.S. Cl.
USPC ............ 353/20; 353/33; 353/81; 359/485.01; 359/485.06; 359/486.02

(58) Field of Classification Search
USPC .............. 353/20, 33, 81; 359/483.01, 485.01, 359/485.06, 486.02
See application file for complete search history.

(56) References Cited

U.S. PATENT DOCUMENTS

| 6,183,090 B1 | 2/2001 | Nakanishi et al. | |
| 2006/0044516 A1* | 3/2006 | Inoko | 353/20 |
| 2008/0304016 A1* | 12/2008 | Miyazawa | 353/20 |

FOREIGN PATENT DOCUMENTS

| CN | 1515120 A | 7/2004 |
| CN | 1584730 A | 2/2005 |
| CN | 1743917 A | 3/2006 |
| CN | 101295075 A | 10/2008 |
| JP | 11-015074 A | 1/1999 |

\* cited by examiner

*Primary Examiner* — Tony Ko
*Assistant Examiner* — Magda Cruz
(74) *Attorney, Agent, or Firm* — Canon USA Inc. IP Division

(57) ABSTRACT

An image projection apparatus guides light from a light source to a first and a second image modulation elements and projects light modulated by the first and second image modulation elements towards an image plane. A first color separation element reflects first linearly polarized light of a first color light so as to guide the first linearly polarized light to the first image modulation element side, transmits second linearly polarized light of the first color light so as to guide the second linearly polarized light to the second image modulation element side, and reflects or transmits both of the first and second linearly polarized light of a second color light so as to guide both of the first and second linearly polarized light of the second color light to the second image modulation element side.

17 Claims, 9 Drawing Sheets

—— P
······ S

IMAGE PROJECTION APPARATUS AND COLOR SEPARATION/COMBINATION OPTICAL SYSTEM

BACKGROUND OF THE INVENTION

1. Field of the Invention

The present invention relates to an image projection apparatus.

2. Description of the Related Art

Conventionally, an image projection apparatus uses an image modulation element, such a liquid crystal element, to modulate—in accordance with an image signal—the polarization direction of linearly polarized light incident thereupon to obtain a high contrast image. One of the challenges in this type of image projection apparatus is to optimize the use of light with a first linear polarization direction while blocking light with a second (orthogonal) polarization direction without diminishing the quality of the image. To that end, various solutions have been proposed. For example, in a conventional image projection apparatus, a polarizing plate is arranged between a dichroic mirror (color separation element) and a polarizing beam splitter that analyzes the light modulated by the image modulation element. Purportedly, this arrangement is used to obtain an image having a sufficiently high contrast.

U.S. Pat. No. 6,183,090 to Nakanishi et al. ("Nakanishi") discusses an image projection apparatus in which light from a light source is guided to an image modulation element via a polarizing beam splitter. In the image projection apparatus disclosed by Nakanishi, the polarization degree of the light incident on the image modulation element is increased by arranging a polarizing plate on the incident side of the polarizing beam splitter. More specifically, since S polarized light is incident on the polarizing beam splitter which guides the light in the red, green, and blue wavelength bands to the image modulation element, the polarizing plate which absorbs or reflects P polarized light is arranged on the incident side of each polarizing beam splitter, so that only S polarized light is transmitted.

However, since the polarizing plate absorbs also reflects a part of the polarized light that needs to be transmitted, the amount of light that passes through the polarizing plate decreases. Thus, there is the problem that although high contrast may be obtained by providing the polarizing plate, the projected image is darker than when the polarizing plate is not inserted on the incident side of each polarizing beam splitter.

SUMMARY OF THE INVENTION

According to an aspect of the present invention, an image projection apparatus configured to guide light beams from a light source to a first and a second image modulation elements and to project light modulated by the first and second image modulation elements towards an image plane. The image projection apparatus includes a first color separation element configured to reflect first linearly polarized light of a first color light so as to guide the first linearly polarized light to the first image modulation element side, and transmit second linearly polarized light of the first color light so as to guide the second linearly polarized light to the second image modulation element side. In either a light path from the first color separation element to the first image modulation element or a light path from the first color separation element to the second image modulation element, a polarizing plate is arranged which absorbs or reflects unnecessary polarized light of either the first linearly polarized light or the second linearly polarized light, and in the other light path, a polarizing plate is not arranged.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
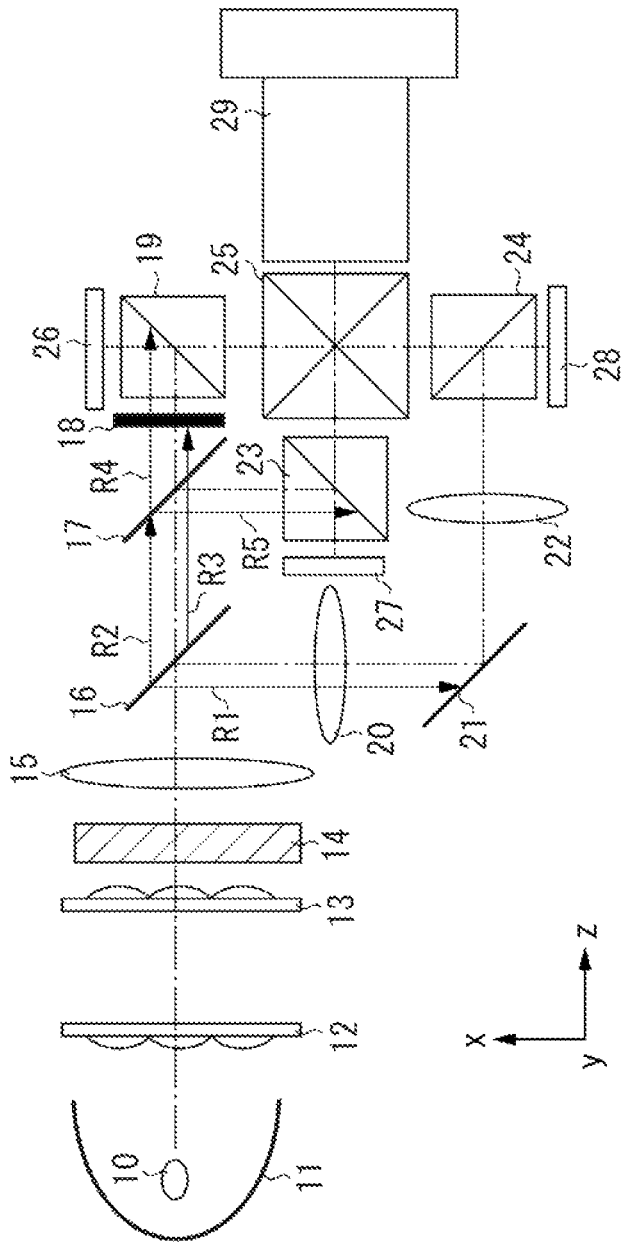
FIG. 1 illustrates an image projection apparatus according to a first exemplary embodiment.

Various exemplary embodiments, features, and aspects of the invention will be described in detail below with reference to the drawings.

Exemplary embodiments of the present invention will now be described using the drawings. In the drawings, the thick black line represents a polarizing plate which analyzes unnecessary light.

In the following description of the exemplary embodiments, the terms "red band", "green band", and "blue band" respectively refer to the light wavelength bands corresponding to red, green, and blue wavelengths in the visible light region. Further, "P polarized light" and "S polarized light" are defined as light having linear polarization directions orthogonal to each other, and may in some instances be interchangeably referred to as "first linearly polarized light" or "second linearly polarized light". In the embodiments using reflective image modulation element, "P polarized light" and "S polarized light" are defined by the polarization splitting surface that is arranged between image modulation element and combination element as entrance surface.

FIG. 1 illustrates a color image projection apparatus according to a first exemplary embodiment. The chain line in FIG. 1 represents an optical axis of a condenser lens 15 or an optical axis of a projection lens 29.

In FIG. 1, a light source unit 10 emits unpolarized light with wavelength bands corresponding to red, green, and blue in the visible light region. The light emitted from the light source unit 10 is reflected by a reflector (paraboloid mirror) 11, and is split into a plurality of light beams by a first fly-eye lens 12 (first lens array). The light beams are condensed near a second fly-eye lens 13 (second lens array) or a PS conversion element (polarized light conversion element) 14 by the first fly-eye lens 12. Thenceforth, the light is aligned as S polarized light (polarized light beams) by the action of the PS conversion element 14. This S polarized light, whose light beams have been aligned in the same polarization direction, is transmitted through the condenser lens 15 and is incident on a first dichroic mirror 16 (first color separation element, light path separation element). The first dichroic mirror 16 has a polarized-light splitting function and a color separating function; specifically, it splits the S polarized light incident thereupon into different light paths based on the wavelength band and polarization direction of the incident light. In the present specification, the elements included in the light path from the light source unit 10 to the condenser lens 15 are collectively referred to as the illumination optical system. Although most of the light that is incident on the first dichroic mirror 16 via the illumination optical system is aligned as S polarized light by the PS conversion element 14, some P polarized light, which is unnecessary light, is also incident on the first dichroic mirror 16. While this will be described in more detail below, the first dichroic mirror 16 and a second dichroic mirror 17, according to the present invention, have a polarized light splitting function in addition to a color separating function.

Among the light incident on the first dichroic mirror 16, the S polarized light in the red band (arrow R1 in FIG. 1) is reflected by the first dichroic mirror 16, passes through a relay lens 20 towards a mirror 21, and a relay lens 22 guides the light reflected by mirror 21 towards a polarizing beam splitter 24. The light path up from the first dichroic mirror 16 to the point where the S polarized light in the red band reflected by the first dichroic mirror 16 is incident on the polarizing beam splitter 24 is hereinafter referred to as the "R light path". The S polarized light beams, which make up most of the light incident on the polarizing beam splitter 24, are reflected by a polarization splitting surface of the polarizing beam splitter 24, and are incident on a reflective liquid crystal panel 28 (reflective image modulation element) for red. The light incident on the liquid crystal panel 28 is modulated into image light (P polarized light) and non-image light (S polarized light) by the reflective liquid crystal panel 28. The image light (P polarized light) is transmitted through the polarization splitting surface of the polarizing beam splitter 24, is reflected by a cross dichroic prism 25, passes through a projection lens 29 (projection optical system), and is projected on a screen (projection surface or image plane). On the other hand, the non-image light (S polarized light) reflected by the reflective liquid crystal panel 28 for red is again reflected by the polarization splitting surface of the polarizing beam splitter 24, and heads back along the R light path towards the light source 10. Here, "image light" refers to the light that, after being emitted from the liquid crystal panel 28, is incident on the projection lens 29, and "non-image light" refers to light whose polarization direction is orthogonal to that of the image light, and which heads back towards the light source 10 after being emitted from the liquid crystal panel 28. The same definition applies to light emitted from liquid crystal panels 26 and 27. Further, the cross dichroic prism 25 has an action for combining the three colors based on the action of two films included therein, and for guiding the combined colors to the projection lens 29 (projection optical system).

Among the light incident on the first dichroic mirror 16, the P polarized light in the red band, which is unnecessary light, is transmitted through the first dichroic mirror 16, and is incident on a second dichroic mirror 17 (second color separation element, light path separation element). Similarly, the s polarized light in the blue and green bands (arrow R2 in FIG. 1) incident on the first dichroic mirror 16 is transmitted through the first dichroic mirror 16, and is guided to the second dichroic mirror 17.

Next, the S polarized light in the green band (arrow R5 in FIG. 1) is reflected by the second dichroic mirror 17 and a polarizing beam splitter 23, is then incident on a reflective liquid crystal panel 27 for green, and is modulated therein. The light path up to the point where the S polarized light in the green band reflected by the second dichroic mirror 17 is incident on the polarizing beam splitter 23 is hereinafter referred to as the "G light path". The image light modulated by the reflective liquid crystal panel 27 is transmitted through the polarization splitting surface of the polarizing beam splitter 23, passes through the cross dichroic prism 25, and is guided to the projection lens 29. The non-image light is again reflected by the polarization splitting surface of the polarizing beam splitter 23, and heads back along the G light path towards the light source 10.

On the other hand, the P polarized light in the green and red bands incident on the second dichroic mirror 17 is transmitted through the second dichroic mirror 17, and is guided to a wire grid (WG) polarizing plate (hereinafter, "WG 18"). Further, the P polarized light in the blue band and the S polarized light in the blue band incident on the second dichroic mirror 17 (R4 in FIG. 1) is also transmitted through the second dichroic mirror 17, and is incident on the WG 18. The WG 18 may also be a common polarizing plate formed from a multilayer film (a type of polarizing plate that reflects unnecessary light).

The WG 18 (polarizing plate) in the present exemplary embodiment transmits the S polarized light and reflects the P polarized light of the light in the red, green, and blue bands (i.e., substantially all of the P polarized light in the visible wavelength region). Further, since the WG 18 is arranged as illustrated in FIG. 1, the unnecessary red, blue, and green P polarized light (arrow R3 in FIG. 1) is reflected by the WG 18, and heads back towards the light source 10. On the other hand, the S polarized light in the blue band (R4) is not reflected by the WG 18, but is transmitted through the WG 18, then reflected by a polarizing beam splitter 19, and modulated by a reflective liquid crystal panel 26 for blue. The light path up to the point where the light in the blue band transmitted through the second dichroic mirror 17 is incident on the polarizing beam splitter 19 is hereinafter referred to as the "B light path". The image light modulated by the reflective liquid crystal panel 26 is transmitted through the polarizing beam splitter 19, passes through the cross dichroic prism 25, and is guided to the projection lens 29. The non-image light is again reflected by the polarizing beam splitter 19, and heads back along the B light path towards the light source 10. Here, the first and second dichroic mirrors 16 and 17, the polarizing beam splitters 19, 23, and 24, the relay lenses 20 and 22, the mirror 21, the WG 18, and the cross dichroic prism 25 are the elements configuring the color separation/combination optical system.

Figure 2A:
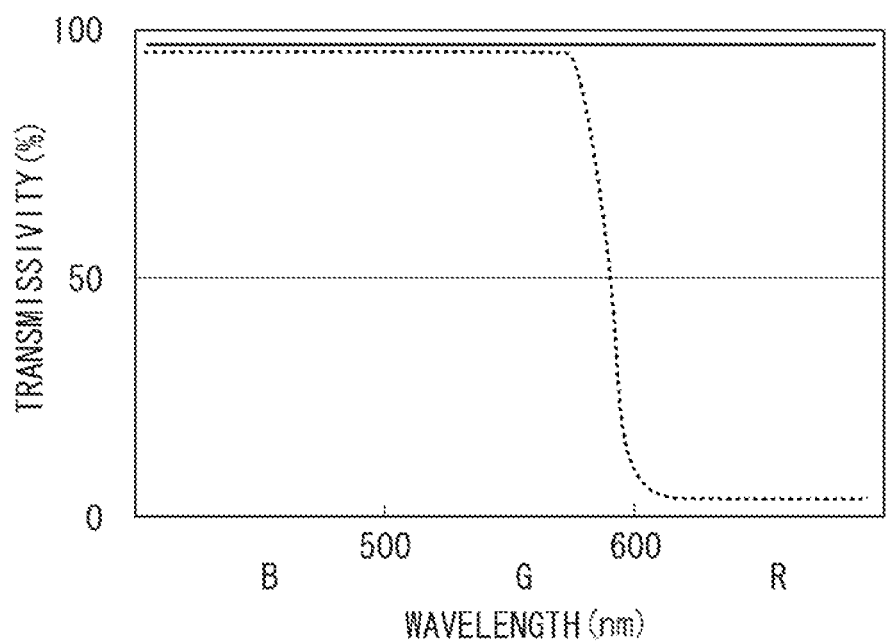
FIGS. 2A and 2B are graphs illustrating the properties of a dichroic mirror according to the first exemplary embodiment.
Figure 2B:
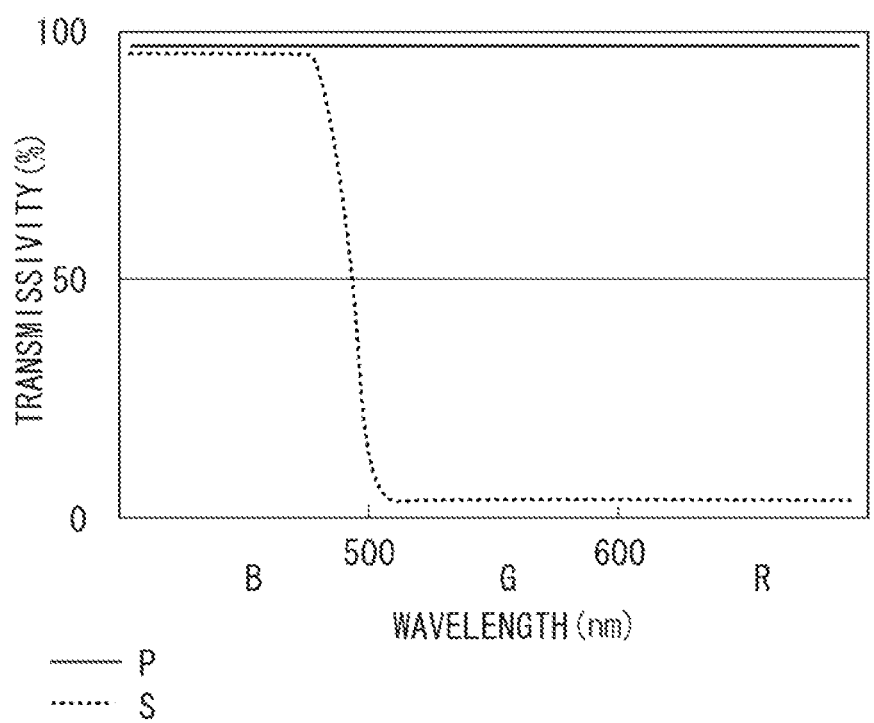

FIGS. 2A and 2B illustrate the properties of the first dichroic mirror 16 and the second dichroic mirror 17, respectively. The solid line represents spectral properties of the P polarized light and the dashed line represents spectral properties of the S polarized light, when the thus polarized light interacts with the first dichroic mirror 16 or the second dichroic mirror 17. The horizontal axis represents wavelength (nm), and the vertical axis represents transmittance (%). The first dichroic mirror 16 (FIG. 2A) has properties which reflect (block) only the S polarized light in the red band, and transmit the S polarized light in the blue and green bands and the P polarized light in the blue, green, and red bands. The second dichroic mirror 17 (FIG. 2B) has properties which reflect (block) the S polarized light in the red and green bands, and transmit the S polarized light in the blue band and the P polarized light in the blue, green, and red bands.

More specifically, a conventional dichroic mirror separates the light paths for each wavelength regardless of whether the light is necessary polarized light or unnecessary polarized light. Consequently, a polarizing plate needs to be provided in each of the light paths to obtain sufficient contrast. However, since the transmittance of the light to be transmitted through the polarizing plates is about 92%, about 8% of the light is lost.

In contrast, in the first exemplary embodiment, the first dichroic mirror 16 has a polarized-light splitting capability in addition to the conventional wavelength separation capability. Further, a polarizing plate does not need to be inserted in the red band light path (R light path), because S polarized light having a high (near 100%) polarizing splitting film reflectance is guided to the reflective liquid crystal panel 28 for red. In addition, the P polarized light beams, which are unnecessary light (light that causes contrast to deteriorate), are not incident on the reflective liquid crystal panel 28 for red. Accordingly, since the amount of light that is lost in the red band can be reduced, a brighter projection image can be obtained than when a polarization plate was inserted in the R light path.

Further, a remarkably advantageous effect can be obtained in the present invention even if only the first dichroic mirror 16 has a polarized light splitting action.

However, in the present exemplary embodiment, the second dichroic mirror 17 is also provided with a polarized light splitting capability for light in the red and green bands. More specifically, the second dichroic mirror 17 splits the S polarized light beams, which are the necessary polarized light beams, and the P polarized light beams, which are the unnecessary polarized light beams. The S polarized light beams are incident on the reflective liquid crystal panel 27 for green and the unnecessary P polarized light is incident on the WG 18 polarizing plate. Consequently, it is no longer necessary to insert a polarizing plate between the second dichroic mirror 17 and the polarizing beam splitter 23 (light path along which only light in the green band travels). Therefore, in addition to the light in the red band, the amount of light that is lost in the green band (light incident on the reflective liquid crystal panel 27 for green) can be reduced.

The unnecessary light will now be considered in more detail. If the P polarized light beams, which are unnecessary light, are condensed in the blue band light path by the first dichroic mirror 16 and the second dichroic mirror 17, and if this unnecessary light is reflected by a single polarizing plate (WG 18), a polarizing plate does not have to be arranged in the green band light path. Consequently, the amount of light lost due to a polarizing plate can be reduced, so that a brighter projection image can be obtained.

More specifically, in the present exemplary embodiment, the dichroic mirror 16 (color separation element) reflects the S polarized light (first linearly polarized light) of the light in the red wavelength band (first color light) so as to guide it to the reflective liquid crystal panel 28 for red (first image modulation element side). On the other hand, the dichroic mirror 16 transmits the P polarized light (second linearly polarized light) of the light in the red wavelength band (first color light) and guides it to the reflective liquid crystal panel 26 for blue (second image modulation element side). A polarizing plate (WG 18) is arranged in only one of the light path between the dichroic mirror 16 and the reflective liquid crystal panel 28 for red or the light path between dichroic mirror 16 and the reflective liquid crystal panel 26 for blue. A polarizing plate is not arranged in the other light path. Consequently, the amount of light in the red wavelength band increases, so that a brighter projection image can be obtained.

Another advantageous effect is that the number of polarizing plates arranged between the dichroic mirror 16 and the polarizing beam splitter (28 or 26) can be reduced, so that a low-cost image projection apparatus can be provided. More specifically, by selectively guiding unnecessary light to a specific light path and arranging a polarizing plate in only that light path, the number of polarizing plates arranged between the dichroic mirror and the polarizing beam splitter can be reduced to one.

Further, another advantageous effect is that the structure of the dichroic mirror film can be simplified, since by letting the first and second dichroic mirrors have the properties illustrated in FIGS. 2A and 2B, there only needs to be one wavelength (cutoff wavelength) at which light switches between reflection and transmission.

The properties of the first and second dichroic mirrors are not limited to those illustrated in FIGS. 2A and 2B. For example, the same advantageous effects can be obtained even if the second dichroic mirror 17 has properties which transmit S polarized light in the blue and red bands but reflects the green band, and transmit P polarized light in the blue, red, and green bands.

In other words, according to the present exemplary embodiment an image projection apparatus guides light beams from a light source to a plurality of image modulation elements, and projects the light modulated by the plurality of image modulation elements onto a surface via a projection optical system. This image projection apparatus has a PS conversion element 14 that aligns the polarization direction of the light beams from the light source as S polarized light beams (in the same direction), and a color separation element (first dichroic mirror 16) that separates the S polarized light beams, whose polarized direction was aligned in the same direction by the polarized light conversion element, and the P polarized light, some of which remains as unnecessary light. Further, the image projection apparatus has a WG 18, which analyzes the unnecessary light that was separated by the color separation element, between the first dichroic mirror 16 and the image modulation elements. This polarizing plate is arranged only in one of the separated light paths.

Stated another way, the image projection apparatus according to the present exemplary embodiment has a first color separation element (first dichroic mirror 16) that separates light beams emitted from a light source unit 10 into first color light R1 and second color light R2 and R3. The image projection apparatus also has a second color separation element (second dichroic mirror 17) that separates the second color light R2 and R3 into third color light R5 and fourth color light R4. Further, the image projection apparatus has a first reflective liquid crystal panel 28 (reflective image modulation element) that modulates and reflects the first color light R1, a second reflective liquid crystal panel 27 that modulates and reflects the third color light R5, and a third reflective liquid crystal panel 26 that modulates and reflects the fourth color light R4. In addition, the image projection apparatus has a first polarizing beam splitter 24, which is arranged between the first dichroic mirror 16 and the first reflective liquid crystal panel 28, a second polarizing beam splitter 23, which is arranged between the second dichroic mirror 17 and the second reflective liquid crystal panel 27, and a third polarizing beam splitter 19, which is arranged between the first dichroic mirror 16 and the reflective liquid crystal panel 26. The image projection apparatus also has a cross dichroic prism 25 (combination element) for combining the light modulated by the first, second, and third reflective liquid crystal panels, and a WG 18 for analyzing unnecessary polarized light beams (unnecessary light). The first dichroic mirror 16 has properties which guide the unnecessary light of the first, third, and fourth color light to the side where the second color light is separated by the first dichroic mirror 16. The second dichroic mirror 17 has properties which guide the unnecessary light of the first, third, and fourth color light to the side where the fourth color light is separated by the second dichroic mirror 17. The unnecessary light split by the second dichroic mirror 17 is analyzed by the WG 18 arranged on the incident side of the third polarizing beam splitter 19.

Even more specifically, the first dichroic mirror 16 reflects the S polarized light of the first color light, and transmits the P polarized light beam of the first color light and the S polarized light beam and the P polarized light beam of the second color light. The second dichroic mirror 17 reflects the S polarized light of the third color light, and transmits the P polarized light beam of the third color light, the P polarized light beam of the first color light, and the S polarized light beam and the P polarized light beam of the fourth color light. Consequently, unnecessary light (the P polarized light beams) are condensed in a specific light path, so that analysis can be performed using a single polarizing plate, which is better.

Still even more specifically, the third color light R5 is light in the blue band. Consequently, the amount of light that is lost in the red and green bands, which have a higher relative luminosity than the blue band, can be decreased, so that a brighter projection image can be obtained.

As a modified example of the present exemplary embodiment, the position of the single polarizing plate inserted to reflect (or absorb) the unnecessary light is not limited to that described above, as long as the position is in a light path between the first dichroic mirror 16 and the polarizing beam splitters 19 and 23. For example, brighter illumination can be achieved by arranging the polarizing plate between the second dichroic mirror 17 and the polarizing beam splitter 23, as at this position there is no loss in the light amount for red and blue light. In this case, the second dichroic mirror may have properties which reflect the P polarized light in all bands and the S polarized light in the red band, and only transmits the S polarized light in the blue band.

In the above configuration, although the polarizing plate was arranged between the second dichroic mirror 17 and the polarizing beam splitter 19, so that the polarizing plate is arranged only in the blue band light path, which has the lowest relative luminosity, the present invention is not limited to this. For example, one polarizing plate may be arranged between the second dichroic mirror 17 and the polarizing beam splitter 19, and another polarizing plate may be arranged between the second dichroic mirror 17 and the polarizing beam splitter 23. Further, the advantageous effects of the present invention can be obtained even if a polarizing plate is not arranged between the first dichroic mirror 16 and the polarizing beam splitter 24, because the amount of light in the blue band is higher than when a polarizing plate is inserted.

However, like in the present exemplary embodiment, it is especially preferable to arrange the WG 18 in the light path between the polarizing beam splitter 19 for analyzing the emerging light from the liquid crystal panel for blue and the second dichroic mirror 17. This is because the lost amount of light having a higher relative luminosity than light in the blue band can be suppressed, so that a projection image that feels brighter can be obtained.

Although the first and second dichroic mirrors in the present exemplary embodiment have a plate shape, the same advantageous effects can be obtained even if they are a prism type dichroic mirror. Further, although the polarizing beam splitter in the present exemplary embodiment was described as a prism type polarizing beam splitter, the same advantageous effects can be obtained for a plate-shaped polarizing beam splitter.

Conditions under which an even better optical performance (contrast or brightness) can be obtained in the present exemplary embodiment will now be described. First, the coordinate axes illustrated in FIG. 1 will be described. The z axis is an axis parallel to the optical axis of the projection lens. The x axis is an axis that is perpendicular to the z axis and parallel to the normal line of the liquid crystal panel. The y axis is an axis that is perpendicular to the x and z axes. In other words, the cross-section including the normal line of the liquid crystal panel (image modulation element) and the normal line of a polarization splitting surface of the polarizing beam splitter is a first cross-section (xz cross-section), and the cross-section that is parallel to the normal line of the liquid crystal panel and perpendicular to the first cross-section is a second cross-section (yz cross-section).

When the F number of the illumination optical system for the yz cross-section (second cross-section) of the coordinate axes illustrated in FIG. 1 is Fy, and the F number of the illumination optical system for the xz cross-section (first cross-section) is Fx, a good optical performance can be obtained by setting Fx/Fy in the range shown by the following equation. This is because the extinction ratio of the dichroic mirror having a polarized light splitting action and the polarizing beam splitter is better for the yz cross-section than the xz cross-section.

$$1.1 < Fx/Fy < 2.5 \qquad (1)$$

Specifically, the F number of the illumination optical system for the first cross-section is larger than the F number of the illumination optical system for the second cross-section.

If the lower limit of the above equation is met, the angle of incidence on the polarization splitting surface is smaller in the yz cross-section than the xz cross-section. Consequently, the optical performance of the projection image improves.

Although according to a configuration of the present exemplary embodiment, the S polarized light beams (as necessary light) are incident on a polarizing beam splitter, the present invention is not limited to this. The advantageous effect of the present invention of suppressing a reduction in contrast can be obtained even if the P polarized light beams are incident on the polarizing beam splitter.

However, since analysis performance at the polarization splitting surface is generally better for S polarized light than P polarized light, the advantageous effects of the present invention are greater in a configuration in which the S polarized light beams are incident on the polarizing beam splitter than when the P polarized light beams are incident on the polarizing beam splitter.

The reason for this is because in a configuration in which the P polarized light beams are incident on the polarizing beam splitter, contrast deteriorates because some of the P polarized light beams emerging from the liquid crystal panel are reflected to the projection lens side by the polarization splitting surface. More specifically, since the analysis properties of the P polarized light of the polarizing beam splitter are low even when the incident light is completely polarized light, to output a predetermined contrast, it is preferable to arrange a polarizing plate on the emerging surface of the polarizing beam splitter (between the polarizing beam splitter and the projection lens). Therefore, a more preferred exemplary embodiment according to the present invention is a configuration in which the S polarized light is incident on the polarizing beam splitter.

Figure 3:
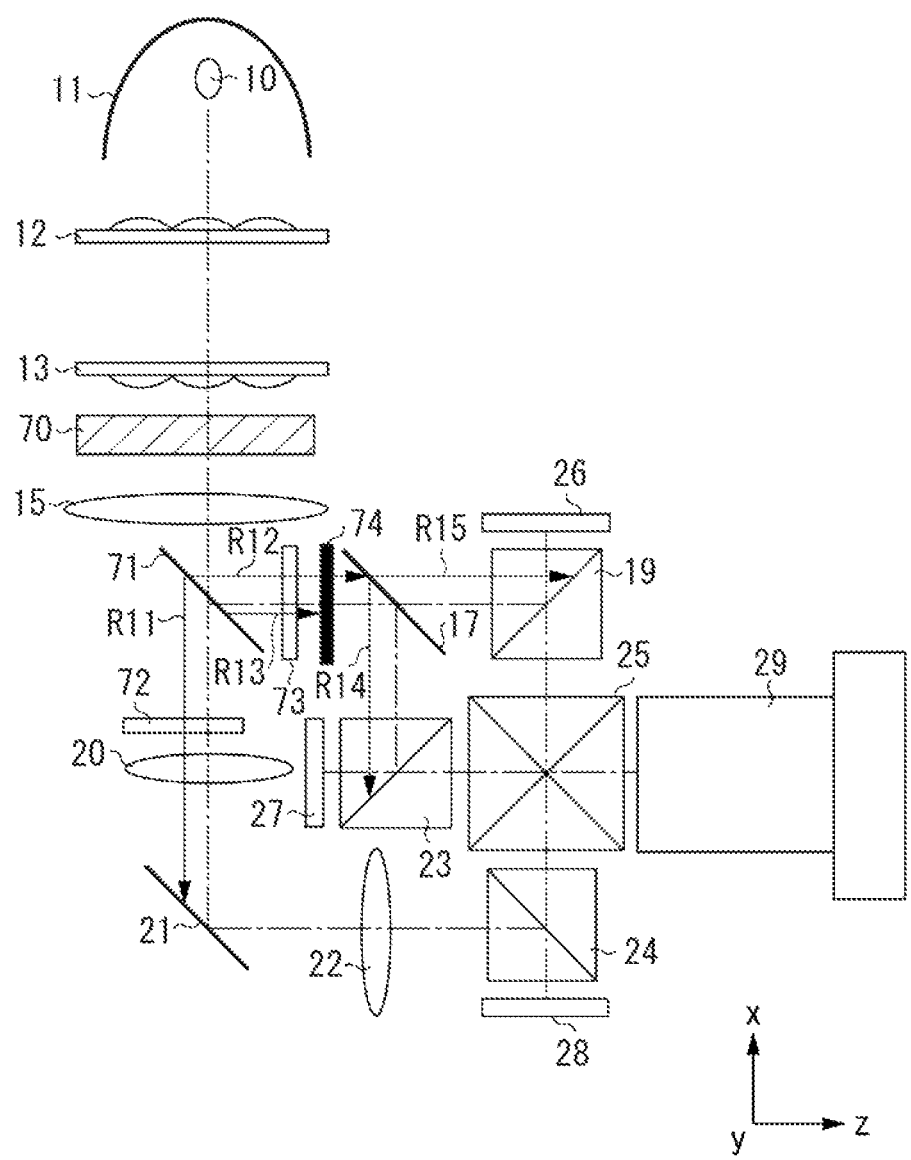
FIG. 3 illustrates an image projection apparatus according to a second exemplary embodiment.

FIG. 3 illustrates an image projection apparatus according to a second exemplary embodiment. In the second exemplary embodiment, the polarization direction of the light incident on the first dichroic mirror is the P polarized light, and a polarizing plate is arranged between the first dichroic mirror (color separation element) and the second dichroic mirror. To avoid repetition, only the differences with FIG. 1 will be described. The chain line in FIG. 3 represents the optical axis of the condenser lens or the optical axis of the projection lens.

Partial light beams emerging from the light source unit 10 and split by the first fly-eye lens 12 are condensed near a second fly-eye lens 13 or a PS conversion element 70. The condensed partial light beams are aligned as P polarized light by the PS conversion element 70, pass through the condenser lens 15, and are incident on a first dichroic mirror 71. The first dichroic mirror 71 transmits the P polarized light in the red band (R11), and reflects the light in the blue and green bands (R12) and the S polarized light in the red band.

The P polarized light in the red band (R11) is transmitted through a λ/2 phase plate 72, is polarized and converted into S polarized light, which passes through the relay lens 20, mirror 21, and relay lens 22, and is incident on the polarizing beam splitter 24. The S polarized light is reflected by the polarizing beam splitter 24 and modulated by the reflective liquid crystal panel 28 for red. The image light (P polarized light) is transmitted through the polarizing beam splitter 24, and is guided to the projection lens 29 via the cross dichroic prism 25. On the other hand, the non-image light (S polarized light) is again reflected by the polarizing beam splitter 24, and heads back toward the light source.

The red, blue, and green S polarized light (R13) reflected by the first dichroic mirror 71 is incident on the λ/2 plate and is converted into P polarized light, which is incident on a polarizing plate 74. The P polarized light in the red, blue, and green bands is absorbed by the polarizing plate 74. The blue and green S polarized light is transmitted through the polarizing plate 74, and is incident on the second dichroic mirror 17. The S polarized light in the green band (R14) is reflected by the second dichroic mirror 17. The S polarized light in the blue band (R15) is transmitted through the second dichroic mirror 17.

The S polarized light in the green band (R14) reflected by the second dichroic mirror 17 is incident on the polarizing beam splitter 23, is reflected by the polarizing beam splitter 23, and modulated by the reflective liquid crystal panel 27 for green. The image light is transmitted through the polarizing beam splitter 23, and is guided to the projection lens 29 via the cross dichroic prism 25. The non-image light is again reflected by the polarizing beam splitter 23, and heads back toward the light source.

The S polarized light in the blue band (R15) that was transmitted through the second dichroic mirror 17 is reflected by the polarizing beam splitter 19, and is modulated by the reflective liquid crystal panel 26 for blue. The image light is transmitted through the polarizing beam splitter 19, and is guided to the projection lens 29 via the cross dichroic prism 25. The non-image light is again reflected by the polarizing beam splitter 19, and heads back toward the light source.

Figure 4:
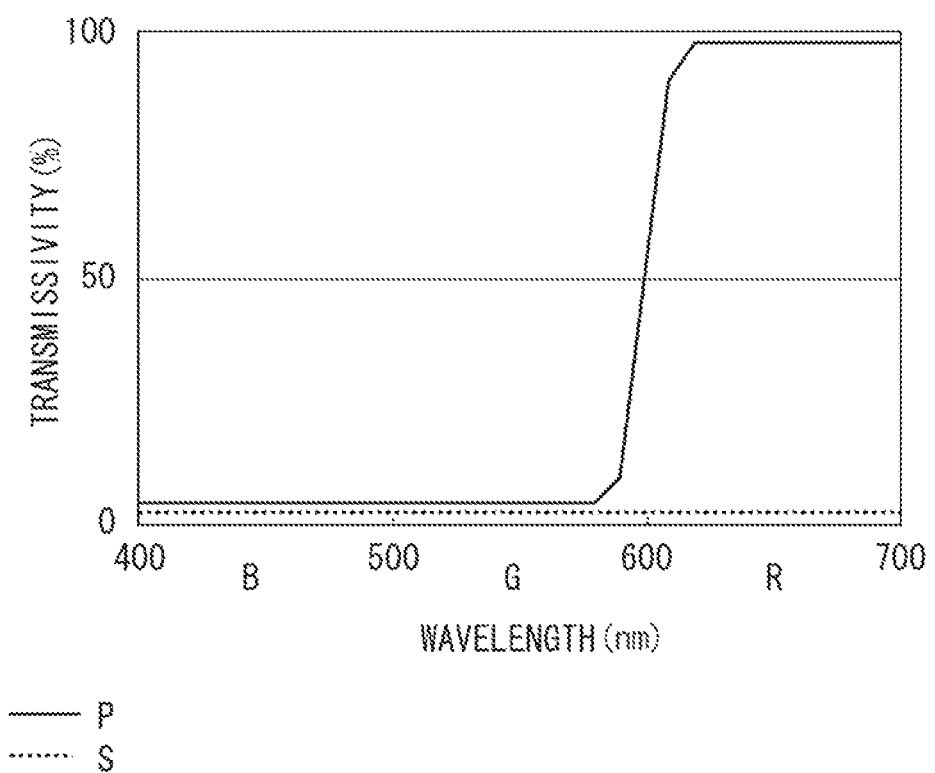
FIG. 4 is a graph illustrating the properties of a dichroic mirror according to the second exemplary embodiment.

FIG. 4 illustrates the properties of the first dichroic mirror 71. The properties of the second dichroic mirror are the same as those illustrated in FIG. 2B. The horizontal axis represents wavelength (nm) and the vertical axis represents transmittance (%). The solid line in FIG. 4 represents the properties of the P polarized light and the dashed line represents the properties of the S polarized light. Regarding the P polarized light, the first dichroic mirror 71 transmits only the light in the red band, and reflects the light in the blue and green bands. Regarding the S polarized light, the first dichroic mirror 71 reflects the light in the blue, green, and red bands.

In the second exemplary embodiment, the first dichroic mirror 71 transmits only the P polarized light in the red band, which is the necessary light, and reflects the S polarized light, which is unnecessary light. Since light can be utilized which has a higher degree of polarization due to the polarized light splitting capability of the first dichroic mirror 71, a polarizing plate does not need to be inserted in the red band light path. Further, as described above, since the first dichroic mirror 71 has a higher transmittance as to the light which is to be transmitted than the polarizing plate, the amount of light that is lost is less than that when a polarizing plate is inserted. In addition, the unnecessary light (S polarized light) reflected by the first dichroic mirror 71 is absorbed by the polarizing plate 74, which is arranged only between the first dichroic mirror 71 and the second dichroic mirror 17. Consequently, a polarizing plate does not have to be arranged in the red band light path like in the conventional art. This enables suppression of the amount of light that is lost in the red band, so that a brighter projection image can be obtained. Further, the same advantageous effects can be obtained even if the light transmitted through the first dichroic mirror 71 is the light in the green band. However, by transmitting the light in the red band, a simpler configuration can be used for the dichroic mirror 71.

Another advantageous effect is that the number of polarizing plates can be reduced, so that a low-cost image projection apparatus can be provided.

In the present exemplary embodiment, the color light that was separated by the first dichroic mirror and guided to the reflective liquid crystal panel without passing through a polarizing plate was light in the red wavelength band. Thus, the light guided to the image modulation element without passing through a polarizing plate has a higher relative luminosity. This means that a projection image that feels brighter can be obtained, which is more preferred. The same advantageous effects can be obtained even if the light that is separated based on polarized light by the first dichroic mirror 71 is in the green band, since the relative luminosity of such light is higher than that in the blue band.

Figure 5:
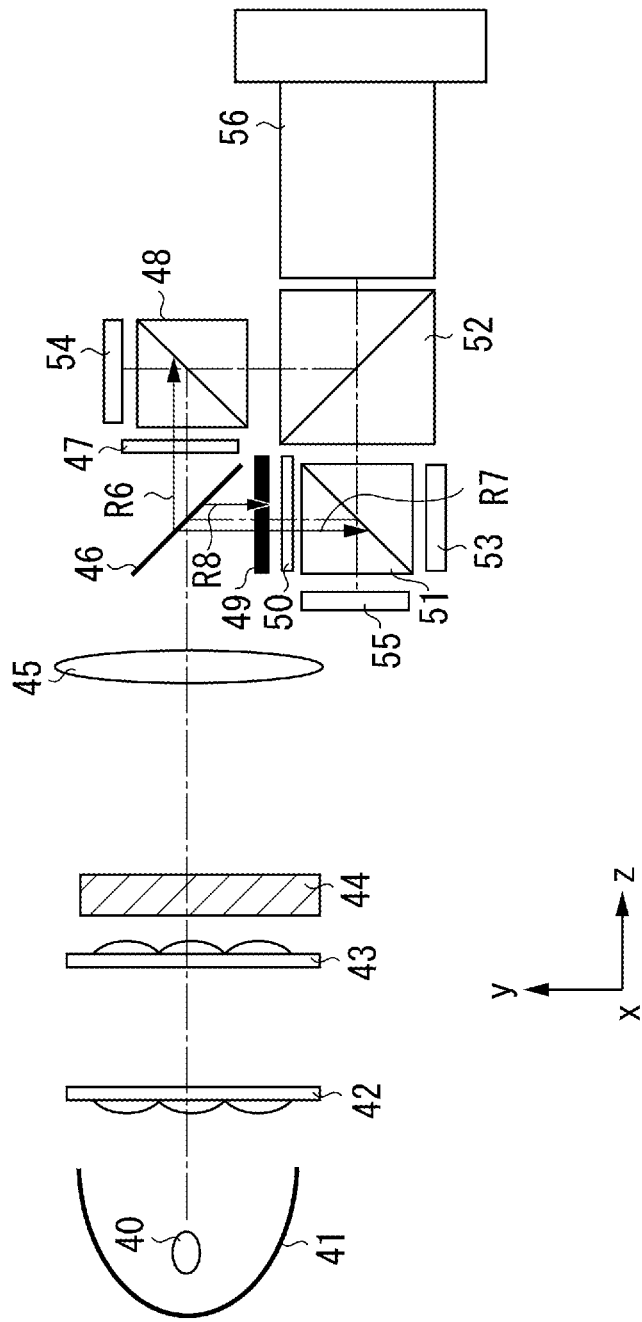
FIG. 5 illustrates an image projection apparatus according to a third exemplary embodiment.

FIG. 5 illustrates an image projection apparatus according to a third exemplary embodiment. The third exemplary embodiment relates to an embodiment in which there are two polarizing beam splitters analyzing the light modulated by the image modulation elements. The chain line in FIG. 5 represents the optical axis of a condenser lens 45 or the optical axis of a projection lens 56.

The light emitted from a light source unit 40 is reflected by a reflector (paraboloid mirror) 41, and is split into partial light beams by a first fly-eye lens 42. The partial light beams are condensed near a second fly-eye lens 43 or a PS conversion element 44, and aligned as P polarized light by the PS conversion element 44. The P polarized light is transmitted through the condenser lens 45, and is incident on a dichroic mirror 46 (color separation element). In the present exemplary embodiment, the illumination optical system is from the light source unit 40 to the condenser lens 45.

The P polarized light in the green band (R6) is transmitted through the dichroic mirror 46 and is converted into S polarized light by passing through a λ/2 phase plate 47, and this S polarized light is incident on a polarizing beam splitter 48. The light path up to the point where the P polarized light in the green band that has been transmitted through the dichroic mirror 46 is incident on the polarizing beam splitter 48 is hereinafter referred to as the "G light path". The S polarized light in the green band is reflected by the polarizing beam splitter 48, and is modulated by a reflective liquid crystal panel 54 for green. The image light is transmitted through the polarizing beam splitter 48, and is guided to the projection lens 56 via a combination prism 52. The non-image light is again reflected by the polarizing beam splitter 48, and heads back toward the light source.

The S polarized light in the green band and the red and blue band light, which is unnecessary light, are reflected by the dichroic mirror 46, and is then incident on a wire grid polarizing plate (hereinafter, "WG 49"). The S polarized light (R8) is reflected by the WG 49, and heads back toward the light source. On the other hand, the P polarized light in the blue and red bands (R7) is transmitted through the WG 49. Only the P polarized light in the red band is converted into S polarized light by a wavelength-selective phase plate 50. The S polarized light in the red band is incident on a polarizing beam splitter 51, is then reflected, and is modulated by a reflective liquid crystal panel 55 for red. The image light is transmitted through the polarizing beam splitter 51, and is guided to the projection lens 56 via the combination prism 52. The non-image light is again reflected by the polarizing beam splitter 51, and heads back toward the light source. In the present exemplary embodiment, the color separation/combination illumination optical system is from the dichroic mirror 46 to the combination prism 52.

The P polarized light in the blue band that has been transmitted through the WG 49 is incident as is as P polarized light on the polarizing beam splitter 51, is then transmitted through the polarizing beam splitter 51, and modulated by a reflective liquid crystal panel 53 for blue. The image light is reflected by the polarizing beam splitter 51, and is guided to the projection lens 56 via the combination prism 52. The non-image light is again transmitted through the polarizing beam splitter 51, and heads back toward the light source.

Figure 6:
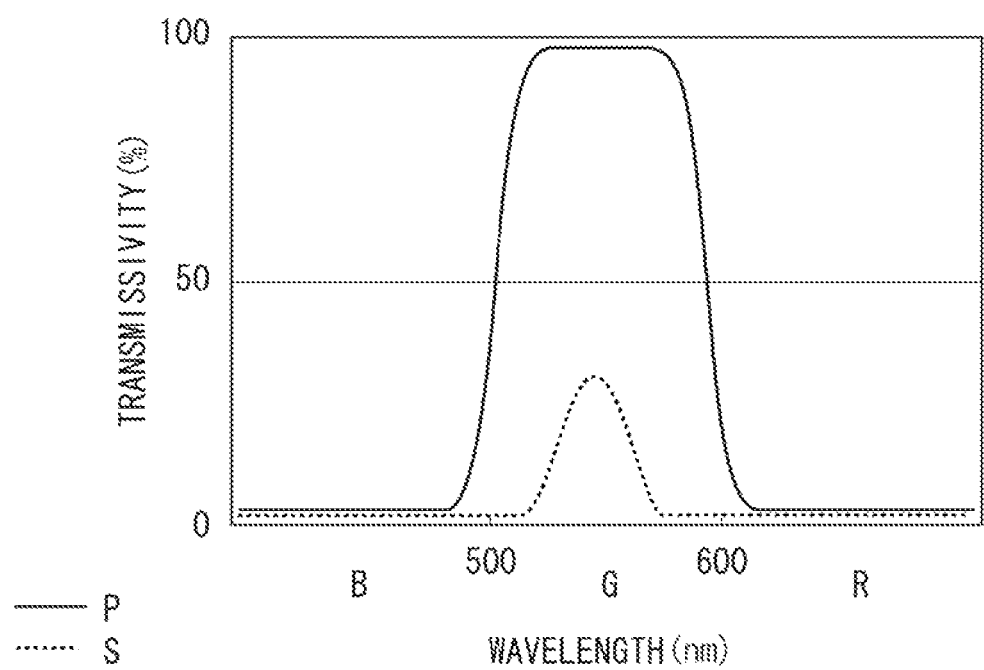
FIG. 6 is a graph illustrating the properties of a dichroic mirror according to the third exemplary embodiment.

FIG. 6 illustrates the properties of the dichroic mirror 46. The horizontal axis represents wavelength (nm) and the vertical axis represents transmittance (%). Regarding the P polarized light, the dichroic mirror 46 transmits only the light in the green band, and reflects the light in the blue and red bands. Regarding the S polarized light, the dichroic mirror 46 reflects the light in the blue, red, and green bands. The solid line in FIG. 6 represents the properties of the P polarized light and the dashed line represents the properties of the S polarized light.

The image projection apparatus illustrated in the third exemplary embodiment separates light beams from the light source unit 40 into light in the green band (first color light) and light in the blue and red bands (second color light). The color light is respectively guided to a reflective liquid crystal panel 54 for green (first image modulation element) and a reflective liquid crystal panel 53 for red (second image modulation element). This image projection apparatus has a dichroic mirror 46 (color separation element) which transmits the P polarized light component (first linearly polarized light) of the light in the green band (first color light), and guides it to the reflective liquid crystal panel 54 for green. Further, this dichroic mirror 46 reflects the S polarized light (second linearly polarized light) of the light in the green band (first color light) and the light in the blue and red bands (second color light), and guides it to the reflective liquid crystal panel 53 for red. In addition, the image projection apparatus has the WG 49 (wire grid polarizing plate) arranged between the dichroic mirror 46 (color separation element) and the reflective liquid crystal panel 53 for red. The image projection apparatus also has the projection lens 56 for projecting light modulated by the reflective liquid crystal panel 54 for green and the reflective liquid crystal panel 53 for red. A polarizing plate is not arranged between the dichroic mirror 46 (color separation element) and the reflective liquid crystal panel 54 for green. The reflective liquid crystal panel 53 for red may be replaced with a reflective liquid crystal panel 55 for blue.

Since a conventional dichroic mirror does not have a polarized light splitting capability, a polarizing plate has to be provided on the incident side of the polarizing beam splitter 48 to absorb or reflect the unnecessary light (S polarized light) that is transmitted through the dichroic mirror. In contrast, based on the above configuration, there is no longer a need to arrange a polarizing plate in the G light path. Consequently, loss of the amount of light in the green band can be suppressed.

Another advantageous effect is that in a configuration that uses two polarizing beam splitters, the number of polarizing plates can be reduced from the conventional two to one, so that a low-cost image projection apparatus can be provided.

Yet another advantageous effect is that because there is no longer a need for a polarizing plate in the green light path, loss of the amount of light (green) having a higher relative luminosity can be suppressed, so that a brighter projection image can be obtained.

Conditions under which even better optical performance (contrast or brightness) can be obtained will now be described. First, the coordinate axes illustrated in FIG. 5 will be described. The z axis is an axis parallel to the optical axis of the projection lens. The y axis is an axis that is perpendicular to the z axis and parallel to the normal line of the liquid crystal panel. The x axis is perpendicular to the y and z axes. In other words, the cross-section including the normal line of the liquid crystal panel (image modulation element) and the normal line of a polarization splitting surface of the polarizing beam splitter is a first cross-section (yz cross-section), and the cross-section that is parallel to the normal line of the liquid crystal panel and perpendicular to the first cross-section is a second cross-section (xz cross-section).

When the F number of the illumination optical system for the xz cross-section (second cross-section) illustrated in FIG. 5 is Fx, and the F number of the illumination optical system for the yz cross-section (first cross-section) is Fy, a good optical performance can be obtained by setting Fx/Fy in the range of the following equation. This is because the properties with respect to the angle of incidence of the dichroic mirror having a polarized light splitting action and the polarizing beam splitter are better in the xz cross-section than the yz cross-section.

$$0.4 < Fx/Fy < 0.9 \quad (2)$$

Specifically, the F number of the illumination optical system for the first cross-section is larger than the F number of the illumination optical system for the second cross-section.

If the lower limit of the above equation is met, the angle of incidence on the polarization splitting surface is smaller in the yz cross-section than the xz cross-section. Consequently, the optical performance of the projection image is improved.

In the present exemplary embodiment, the S polarized light transmittance $T_s$ of the dichroic mirror 46 at 550 nm is $10\% < T_s < 60\%$. If the transmittance is less than this lower limit, the total number of dichroic mirror films increases. In addition, the level of freedom in selecting the film material decreases. If the transmittance exceeds 60%, the amount of S polarized light in the green light path increases, causing contrast to deteriorate.

More preferably, a wavelength-selective polarizing plate which transmits the P polarized light in the blue band and transmits the red band light, and absorbs or reflects the S polarized light in the blue band, is arranged in the light path from the polarizing beam splitter 51 to the projection lens 56. By providing this wavelength-selective polarizing plate, tint and contrast are further improved. Further, by adopting the combination prism 52 that has film properties which transmit the P polarized light in the blue and red bands and reflects the S polarized light in the green and red bands, tint and contrast are further improved.

In addition, in the first to third exemplary embodiments, although the dichroic mirror was provided with a polarized light splitting action, the polarizing beam splitter may be provided with a wavelength separation capability.

Figure 7:
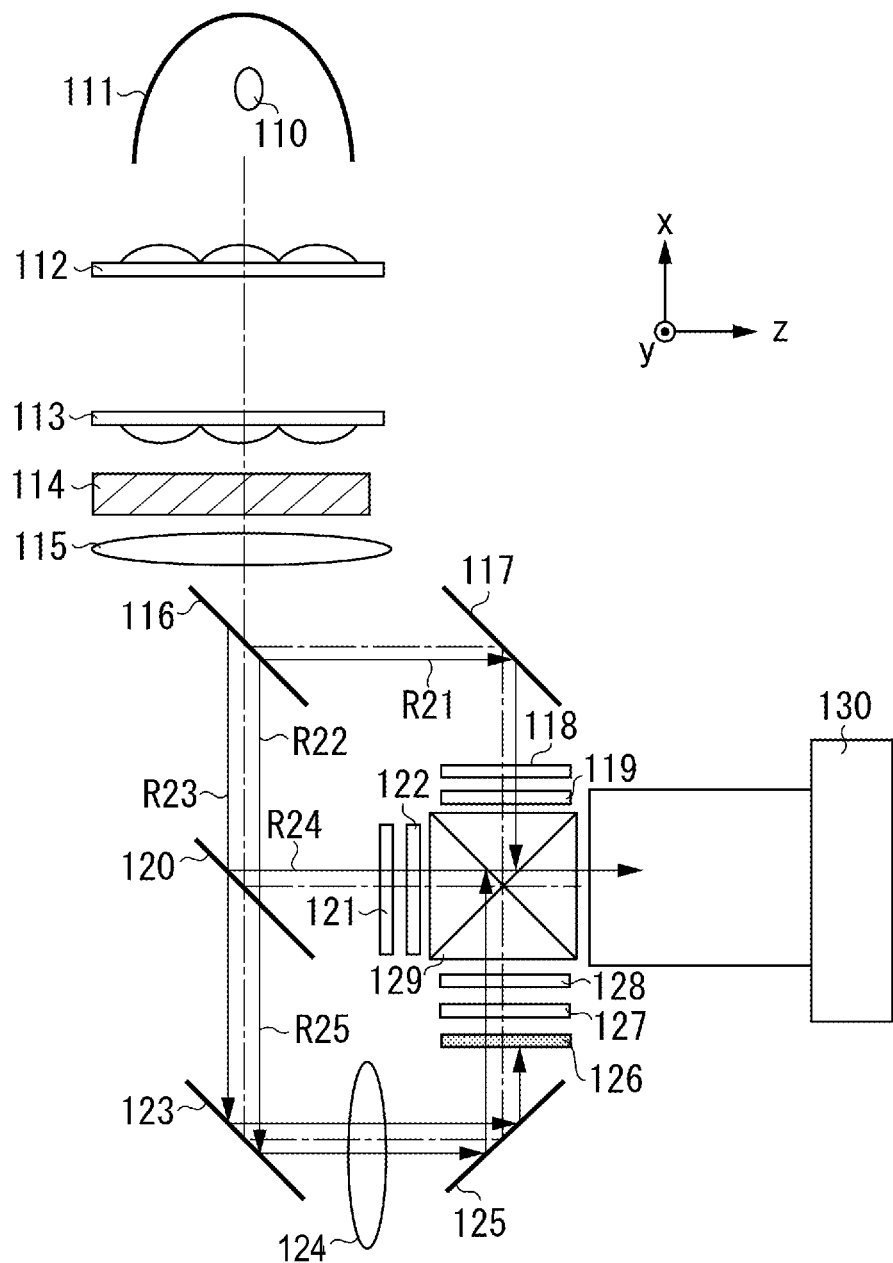
FIG. 7 illustrates an image projection apparatus according to a fourth exemplary embodiment.

FIG. 7 illustrates a color image projection apparatus according to a fourth exemplary embodiment. The chain line in FIG. 7 represents an optical axis of a condenser lens or an optical axis of a projection lens. Unlike the first to third exemplary embodiments, transmissive image modulation elements are used for the image modulation elements.

The light emitted from a light source unit 110 is reflected by a reflector (paraboloid mirror) 111, and is split into partial light beams by a first fly-eye lens 112. The partial light beams are condensed near a second fly-eye lens 113 or a PS conversion element (polarized light conversion element) 114, and aligned as S polarized light (polarized light beams) by the PS conversion element 114. This S polarized light, whose light beams have been aligned in the same polarization direction, is transmitted through the condenser lens 115 and is incident on a first dichroic mirror 116 (color separation element) having a polarized light splitting action, so that the light paths are separated based on the wavelength band and polarization direction. The illumination optical system is from the light source unit 110 to the condenser lens 115. Although most of the light that is incident on the first dichroic mirror 116 via this illumination optical system is aligned as S polarized light by the PS conversion element 114, there is also some unnecessary P polarized light incident on the first dichroic mirror 116.

Among the light incident on the first dichroic mirror 116, the S polarized light in the red band (R21) is reflected by the first dichroic mirror 116, passes through a mirror 117, and is incident on a transmissive liquid crystal panel 118 for red. The light path up to the point where the S polarized light in the red band reflected by the first dichroic mirror 116 is incident on the transmissive liquid crystal panel 118 for red (transmissive image modulation element) is hereinafter referred to as the "R light path". This incident light is modulated by the transmissive liquid crystal panel 118 for red. Among the modulated light, the image light (P polarized light) is transmitted through the polarizing plate 119, and is reflected by a cross dichroic prism 129. The image light reflected by the cross dichroic prism 129 passes through a projection lens 130 (projection optical system), and is projected on a screen (projection surface). Since the cross dichroic prism has a polarizing splitting film, it is a kind of polarizing beam splitter.

On the other hand, the non-image light (S polarized light) transmitted through the transmissive liquid crystal panel 118 for red is absorbed by the polarizing plate 119. Here, "image light" refers to the light that, after being emitted from the liquid crystal panel, is incident on the projection lens, and "non-image light" refers to light whose polarization direction is orthogonal to that of the image light, which is absorbed by the polarizing plate or reflected out of the light path after being emitted from the liquid crystal panel. Further, the cross dichroic prism 129 has an action for combining the three colors based on the action of two films and guiding the combined colors to the projection lens (projection optical system).

Among the light incident on the first dichroic mirror 116, the P polarized light in the red band, which is unnecessary light, is transmitted through the first dichroic mirror 116, and is incident on a second dichroic mirror 120. Similarly, the light in the blue and green bands incident on the first dichroic mirror 116 (R22) is also transmitted through the first dichroic mirror 116, and is guided to the second dichroic mirror 120.

Next, the S polarized light in the green band (R24) is reflected by the second dichroic mirror 120, and is modulated by a transmissive liquid crystal panel 121 for green. The light path up to the point where the S polarized light in the green band reflected by the second dichroic mirror 120 is incident on the transmissive liquid crystal panel 121 for green is hereinafter referred to as the "G light path". The image light modulated by the liquid crystal panel is transmitted through a polarizing plate 122, passes through the cross dichroic prism 129, and is guided to the projection lens 130. The non-image light is absorbed by the polarizing plate 122.

On the other hand, the P polarized light in the green and red bands incident on the second dichroic mirror 120 is transmitted through the second dichroic mirror 120, and is guided to a wire grid polarizing plate (hereinafter, "WG 126"). Further, the P polarized light in the blue band and the S polarized light (R25) incident on the second dichroic mirror 120 are also transmitted through the second dichroic mirror 120, pass through a first mirror 123, a relay lens 124, and a second mirror 125, and are incident on the WG 126.

The WG 126 in the present exemplary embodiment transmits the S polarized light and reflects the P polarized light. Therefore, the unnecessary red, blue, and green P polarized light (R23) is reflected by the WG 126, and heads back toward the light source. On the other hand, the S polarized light in the blue band (R25) is not reflected by the WG 126, but is transmitted through the WG 126, then modulated by a transmissive liquid crystal panel 127 for blue. The light path up to the point where the light in the blue band transmitted through the second dichroic mirror 120 is incident on the transmissive liquid crystal panel 127 for blue is hereinafter referred to as the "B light path". The image light modulated by the liquid crystal panel is transmitted through a polarizing plate 128, passes through the cross dichroic prism 129, and is guided to the projection lens 130. The non-image light is absorbed by the polarizing plate 128.

The properties of the first dichroic mirror 116 and the properties of the second dichroic mirror 120 are the same as the properties illustrated in FIGS. 2A and 2B, respectively. Therefore, a description thereof is omitted here.

In the fourth exemplary embodiment, the dichroic mirror 116 has a polarized light splitting capability. Thus, in this exemplary embodiment, the dichroic mirror 116 guides the S polarized light, which has a polarizing splitting film reflectance of near 100%, to the transmissive liquid crystal panel 118 for red, and transmits the unnecessary P polarized light so that it is not guided to the transmissive liquid crystal panel for red. Consequently, a polarizing plate does not need to be inserted between the light source and the transmissive liquid crystal panel for red, so that loss of amount of light in the R light path can be reduced.

The second dichroic mirror 120 will now be considered in more detail. The second dichroic mirror 120 has a polarized light splitting capability for light in the red and green bands, so that the S polarized light, which is the necessary polarized light, and the P polarized light, which is the unnecessary polarized light, are separated. Consequently, there is no longer a need to insert a polarizing plate between the second dichroic mirror 120 and the transmissive liquid crystal panel 121 for green (the light path along which only light in the green band travels). Therefore, loss of amount of light incident on the transmissive liquid crystal panel 121 for green can be reduced.

The unnecessary light will now be considered in more detail. The unnecessary P polarized light is condensed in the blue band light path by the first dichroic mirror 116 and the second dichroic mirror 120. This unnecessary light is reflected (or absorbed) by a single WG 126. Consequently, for the red and green band light paths, a polarizing plate does not need to be provided in the light path (illumination optical system light path) between the light source and the transmissive liquid crystal panel. Therefore, the amount of light lost due to a polarizing plate can be reduced, so that a brighter projection image can be obtained.

Conventionally, transmissive image projection apparatuses (liquid crystal projectors) have needed a polarizing plate in the light path (illumination optical system light path) for each band between the light source and the transmissive liquid crystal panels.

In the fourth exemplary embodiment, since a polarizing plate does not need to be arranged in the R and G light paths, the amount of light in the red and green bands increases.

Another advantageous effect is that the number of polarizing plates can be reduced, so that a low-cost image projection apparatus can be provided. More specifically, by guiding unnecessary light to a specific light path and arranging a polarizing plate in only that light path, the number of polarizing plates arranged between the dichroic mirrors and the transmissive liquid crystal panel can be reduced to one.

The properties of the first and second dichroic mirrors are not limited to those illustrated in FIG. 2. For example, the same advantageous effects can be obtained even if the second dichroic mirror 120 has properties in which S polarized light is transmitted in the blue and red bands but reflected in the green band, and P polarized light is transmitted in the blue, red, and green bands.

Further, another advantageous effect is that the structure of the dichroic mirror film can be simplified, since by letting the first and second dichroic mirrors have the properties illustrated in FIG. 2, there only needs to be one wavelength (cutoff wavelength) at which light switches between reflection and transmission.

For a color separation/combination optical system that separates light into red, blue, and green color light, the position of the inserted polarizing plate for reflecting unnecessary light is not limited to the position described in the present exemplary embodiment. The polarizing plate may be arranged anywhere, as long as the position is between the first dichroic mirror 116 and the transmissive liquid crystal panel 127 for blue. However, it is preferable to arrange the polarizing plate on the incident side of the transmissive liquid crystal panel for blue, like in the present exemplary embodiment. This is because, by arranging the WG 126 between the transmissive liquid crystal panel 127 for blue and the second dichroic mirror 120, loss of amount of light having a higher relative luminosity than light in the blue band can be suppressed. More specifically, this is because a brighter projection image can be obtained than when a polarizing plate is inserted in the light path along which green and red illumination light travels.

In the above configuration, although the polarizing plate was arranged between the second dichroic mirror 120 and the transmissive liquid crystal panel 127 for blue, so that the polarizing plate is arranged only in the blue band light path, which has the lowest relative luminosity, the present invention is not limited to this. For example, one polarizing plate may be arranged between the second dichroic mirror 120 and the transmissive liquid crystal panel 127 for blue, and another polarizing plate may be arranged between the second dichroic mirror 120 and the transmissive liquid crystal panel 121 for green. Further, the advantageous effects of the present invention can be obtained even if a polarizing plate is not arranged between the first dichroic mirror 116 and the transmissive liquid crystal panel 118 for red, because the amount of light in the blue band is higher than when a polarizing plate is inserted.

Although the first and second dichroic mirrors in the present exemplary embodiment have a plate shape, the same advantageous effects can be obtained even if they are a prism type dichroic mirror.

Figure 8:
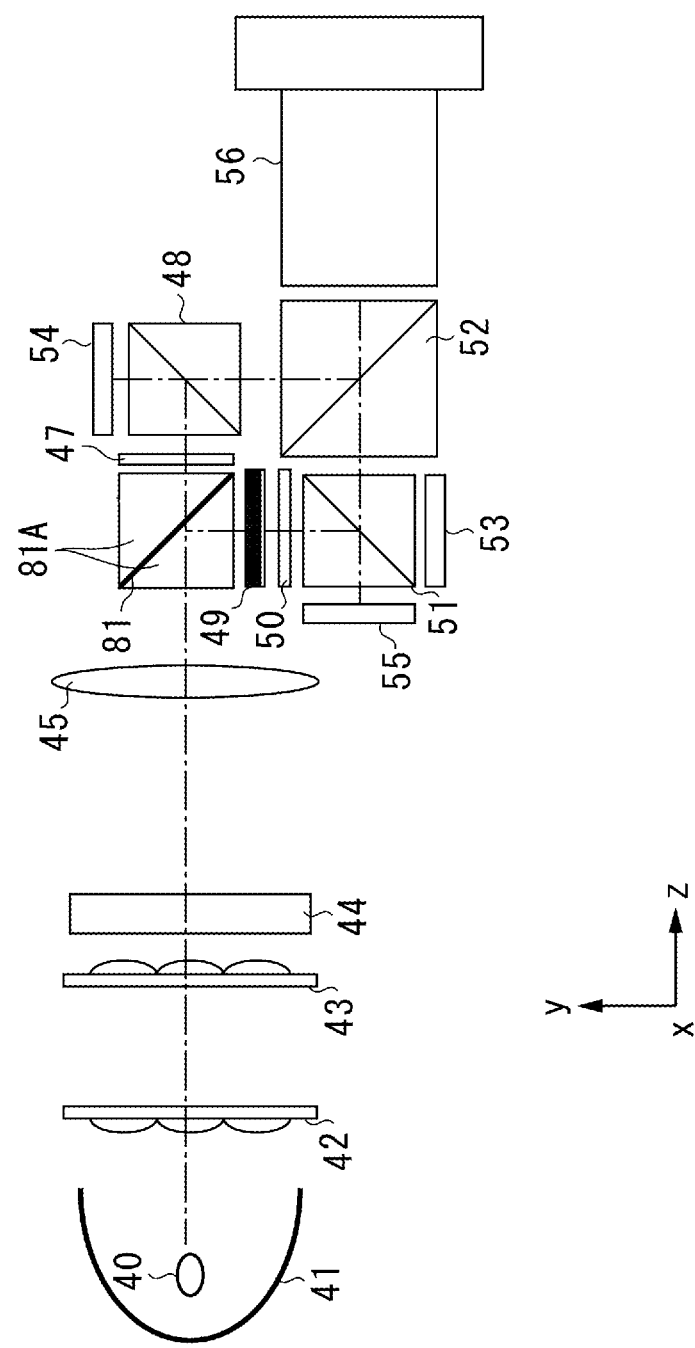
FIG. 8 illustrates an image projection apparatus according to a fifth exemplary embodiment.

FIG. 8 illustrates the configuration of an image projection apparatus according to a fifth exemplary embodiment. The image projection apparatus according to the present exemplary embodiment is configured such that a dichroic mirror 81 having a color separation action and a polarized light splitting action is sandwiched by a pair of square-column prisms 81A. Alternatively, a dichroic film for separating colors may be vapor-deposited on square-column prisms 81A, and the respective prisms 81A can be stuck together with the dichroic mirror 81 therebetween, as illustrated in FIG. 8. That is, in accordance with the present embodiment, the first color separation element is sandwiched by prisms.

Figure 9A:
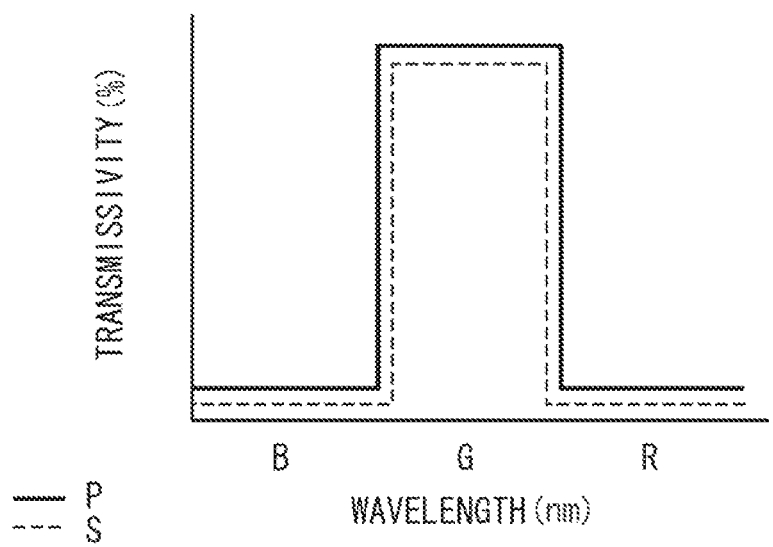
FIGS. 9A and 9B are graphs illustrating the properties of a dichroic mirror according to the fifth exemplary embodiment.
Figure 9B:
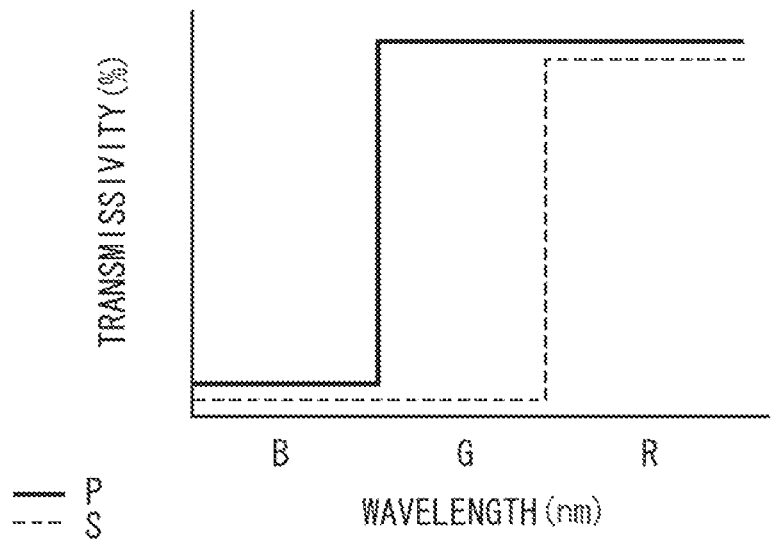

Except for this dichroic mirror 81, the present exemplary embodiment has the same configuration as in the third exemplary embodiment. The dichroic mirror 81 on a first surface thereof has a film which exhibits the properties illustrated in FIG. 9A, and a film which exhibits the properties illustrated in FIG. 9B on the surface opposing the first surface. FIGS. 9A and 9B schematically illustrate the transmittance of the films for each wavelength band. The solid line represents the P polarized light, and the dashed line represents the S polarized light. If the face on the WG 49 side of the dichroic mirror 81 is a first surface (incident face) and the face on the opposite side to the first surface is a second surface (emerging face), the first surface has the properties illustrated in FIG. 9A. Based on these properties, the dichroic mirror 81 transmits the light in the green wavelength band, and reflects the light in the blue and red wavelength bands. The second surface has the properties illustrated in FIG. 9B. Based on these properties, concerning the P polarized light, the dichroic mirror 81 reflects the light in the blue wavelength band, and transmits the light in the green and red wavelength bands. Concerning the S polarized light, the dichroic mirror 81 reflects the light in the blue and green wavelength bands, and transmits the light in the red wavelength band. Consequently, the first surface of the dichroic mirror 81 has only a color separation function, in which light in the green wavelength band is transmitted and light in the red and blue wavelength bands is reflected. The second surface has a polarized light splitting function, in which among the light in the green wavelength band that was transmitted through the first surface, the S polarized light in the green wavelength band that is the unnecessary light in the present exemplary embodiment is reflected to the side on which the WG 49 is arranged. Specifically, the first surface of the dichroic mirror 81 does not have a polarized light splitting action and has only a color separation action. The second surface does not have a color separation action, it has only a polarized light splitting action.

By arranging the films having the above properties on the first and second surfaces of the dichroic mirror, the dichroic mirror 81 transmits the P polarized light in the green wavelength band and reflects the S polarized light in the blue, green, and red wavelength bands. Consequently, since the first surface only needs to have a color separating action and the second surface only needs to have an analyzing (polarized light splitting) action for just the green wavelength band, an image projection apparatus can be provided which does not need a polarizing plate in the light path in the green wavelength band while suppressing an increase in the number of films. Concerning the P polarized light in the green wavelength band reflected by the dichroic mirror 81 and the light in the red and blue wavelength bands, only the P polarized light is reflected by the WG 49. The S polarized light is transmitted through it. The wavelength-selective phase plate 50 converts the polarized light direction in either the red or blue wavelength band, 90°. The liquid crystal panels 53 and 55 for red and blue may be appropriately arranged based on the characteristics of the wavelength-selective phase plate 50. Due to the dichroic mirror 81, the polarized light direction of the P polarized light of the transmitted light in the green wavelength band is rotated 90° by the λ/2 phase plate 47. Consequently, this light is converted into S polarized light, which is incident on the polarizing beam splitter 48. Further, the second surface having a polarized light splitting action may be configured by laminating a plurality of thin films, or may be realized by a periodic uneven structure like a wire grid.

The dichroic mirror 81 (color separation element) preferably has a transmittance of 10% or more to 70% or less for S polarized light in the 550 nm wavelength.

The configuration of the dichroic mirror 81 in the fifth exemplary embodiment is not limited to the one sandwiched by a prism, and may be, for example, sandwiched by a transparent plate. Further, the properties of the second surface are not limited to those illustrated in FIG. 9B. The second surface can have properties which transmit or reflect light in the blue and red wavelength bands. Further, as long as the second surface has an action for analyzing light in a desired wavelength band, the second surface may have analysis properties that reflect the P polarized light and transmit the S polarized light in the green wavelength band. Concerning the first to fifth exemplary embodiments, when considering the contrast in more detail, regarding the light at least in the wavelength bands for which a polarized light splitting capability is provided, such light can be incident on the respective liquid crystal panels with a suppressed level of scattered polarized light. Therefore, the amount of light lost due to a polarizing plate can be reduced while suppressing a deterioration in contrast.

Further, although a high pressure mercury lamp was used as the light source in the first to fifth exemplary embodiments, the light source is not limited to this. For example, a light-emitting diode (LED) may be used as a light source.

Further, the polarizing plate used in first to fifth exemplary embodiments may be a wire grid polarizing plate, a glass polarizing filter, or a polarizing film, as long as such polarizing plate has an action of absorbing or reflecting either P polarized light or S polarized light. However, when a wire grid polarizing plate (reflective polarizing plate) is used that reflects unnecessary light, the amount of illumination light is higher than when an absorption-type polarizing plate is used, because the reflected light heads back to the light source side to be reused.

The arrangement position of the reflective liquid crystal panels and the light paths of the light in each band may be appropriately changed. Further, the properties of the dichroic mirror may also be changed accordingly.

The number of reflective liquid crystal panels is not limited to three. The present invention may be applied even to configurations using two liquid crystal panels or four liquid crystal panels.

In addition, although a combination prism (combination element) was used to combine the red, blue, and green color light, a plurality of color light beams may also be projected onto the projected surface based on time-division without using a combination element.

While the present invention has been described with reference to exemplary embodiments, it is to be understood that the invention is not limited to the disclosed exemplary embodiments. One aspect of the present invention is directed to providing an image projection apparatus that suppresses the amount of light loss due to a polarizing plate. Other aspects and modifications thereof will become apparent to persons of ordinary skill in the art from the above described principles and embodiments. Thus, the scope of the following claims is to be accorded the broadest interpretation so as to encompass all modifications, equivalent structures, and functions.

This application claims priority from Japanese Patent Applications No. 2010-137471 filed Jun. 16, 2010 and No. 2011-081975 filed Apr. 1, 2011, which are hereby incorporated by reference herein in their entirety.

What is claimed is:

1. An image projection apparatus configured to guide light from a light source to a first and a second image modulation elements and to project light modulated by the first and second image modulation elements towards an image plane, the image projection apparatus comprising:

a first color separation element configured to reflect first linearly polarized light of a first color light so as to guide the first linearly polarized light to the first image modulation element side, transmit second linearly polarized light of the first color light so as to guide the second linearly polarized light to the second image modulation element side, and to reflect or transmit both of the first and second linearly polarized light of a second color light so as to guide both of the first and second linearly polarized light of the second color light to the second image modulation element side, wherein, in either a light path from the first color separation element to the first image modulation element or a light path from the first color separation element to the second image modulation element, a polarizing plate is arranged which absorbs or reflects unnecessary polarized light of either the first linearly polarized light or the second linearly polarized light, and in the other light path, a polarizing plate is not arranged.

2. The image projection apparatus according to claim 1, wherein only one polarizing plate is arranged in the light paths between the first color separation element and the first and second image modulation elements.

3. The image projection apparatus according to claim 1, wherein the polarizing plate is arranged between the first color separation element and an image modulation element configured to modulate light in a blue wavelength band.

4. The image projection apparatus according to claim 1, further comprising a polarizing beam splitter that is arranged between the first color separation element and the image modulation elements, wherein S polarized light beams are incident on the polarizing beam splitter.

5. The image projection apparatus according to claim 4, further comprising an illumination optical system in which light from the light source is incident on the first color separation element,
   wherein, if a cross-section including a normal line of a polarization splitting surface of the polarizing beam splitter and a normal line of the first image modulation element is a first cross-section, and a cross-section that is parallel to the normal line of the first image modulation element and perpendicular to the first cross-section is a second cross-section, an F number of the illumination optical system for the first cross-section is larger than the F number of the illumination optical system for the second cross-section.

6. The image projection apparatus according to claim 1, wherein the first color separation element has properties that transmit P polarized light beams in a green band and reflect P polarized light beams in a blue and a red band and S polarized light beams, and
   wherein the polarizing plate is configured to analyze the P polarized light beams in the blue and red bands reflected by the first color separation element.

7. The image projection apparatus according to claim 1, further comprising a second color separation element configured to split the second color light into a third color light and a fourth color light,
   wherein the second color separation element is configured to reflect the first linearly polarized light of the third color light, and to transmit the second linearly polarized light of the first color light, the second linearly polarized light of the third color light, and the second linearly polarized light of the fourth color light, and
   wherein the polarizing plate is configured to analyze the second linearly polarized light transmitted through the second color separation element.

8. The image projection apparatus according to claim 1, wherein the first color separation element has a film on a first surface thereof facing towards the polarizing plate, the film on the first surface being configured to transmit the first color light and to reflect other color light, and
   wherein the first color separation element has a film on a second surface thereof opposite to the first surface, the film or structure on the second surface having reflection and transmission properties that differ based on a polarization direction of the first color light.

9. The image projection apparatus according to claim 8, wherein the first color separation element is sandwiched between prisms.

10. The image projection apparatus according to claim 1, wherein the image modulation elements are transmissive image modulation elements.

11. An image projection apparatus configured to guide light from a light source to a plurality of image modulation elements and to project light modulated by the plurality of image modulation elements towards an image plane, the image projection apparatus comprising:
   a polarization conversion element configured to align a polarization direction of the light from the light source to S polarized light;
   a light path separation element configured to separate the S polarized light of a first color having a polarization direction aligned by the polarization conversion element and P polarized light of the first color partially remaining as unnecessary light; and
   a polarizing plate arranged between the light path separation element and one of the image modulation elements and configured to analyze the unnecessary light separated by the light path separation element,
   wherein, among the light paths separated into S polarized light and P polarized light by the light path separation element, the polarizing plate is arranged in only one of the light paths, and
   wherein the light path separation element is configured to not separate S polarized light and P polarized light of a second color of a wavelength different from a wavelength of the first color.

12. A color separation/combination optical system configured to guide light from a light source to a first and a second image modulation elements and combine light modulated by the first and second image modulation elements, the optical system comprising:
   a first color separation element configured to reflect first linearly polarized light of a first color light so as to guide the first linearly polarized light to the first image modulation element side, transmit second linearly polarized light of the first color light so as to guide the second linearly polarized light to the second image modulation element side, and to reflect or transmit both of the first and second linearly polarized light of a second color light so as to guide both of the first and second linearly polarized light of the second color light to the second image modulation element side,
   wherein, in either a light path from the first color separation element to the first image modulation element or a light path from the first color separation element to the second image modulation element, a polarizing plate is arranged which absorbs or reflects unnecessary polarized light of either the first linearly polarized light or the second linearly polarized light, and in the other light path, a polarizing plate is not arranged.

13. An image projection apparatus configured to guide light from a light source to a first and a second image modulation elements and to project light modulated by the first and second image modulation elements towards an image plane, the image projection apparatus comprising:
   a light separating element having a polarized-light splitting function and a color separating function configured to reflect S polarized light of a first color so as to guide the S polarized light of the first color to the first image modulation element, and to transmit P polarized light of the first color and S polarized light of a second color so as to guide the P polarized light of the first color and both of the P polarized light and the S polarized light of the second color to the second image modulation element; and
   a polarizing plate configured to reflect unnecessary light of the S polarized light or the P polarized light,
   wherein the polarizing plate is arranged in only one of a light path from the light separating element to the first image modulation element and a light path from the light separating element to the second image modulation element.

14. An image projection apparatus configured to guide light from a light source to a first and a second image modulation elements and to project light modulated by the first and second image modulation elements towards an image plane, the image projection apparatus comprising:
   a light separating element having a polarized-light splitting function and a color separating function configured to reflect light of a first color polarized in a first direction, and to transmit light of the first color polarized in a second direction and light of a second color polarized in the first direction and light of the second color polarized in the second direction, wherein the light separating element guides the light of the first color polarized in the first direction to the first image modulation element, and guides the light of the first color polarized in the second direction and the light of the second color polarized in the first direction to the second image modulation element; and a polarizing plate configured to reflect unnecessary light of the first color light polarized in the second direction or unnecessary light of the second color polarized in the second direction, wherein the polarizing plate is arranged in only one of a light path from the light separating element to the first image modulation element and a light path from the light separating element to the second image modulation element, and wherein the first direction is orthogonal to the second direction.

15. An image projection apparatus configured to guide light from a light source to a first and a second image modulation elements and to project light modulated by the first and second image modulation elements towards an image plane, the image projection apparatus comprising:

a first color separation element configured to reflect first linearly polarized light of a first color light so as to guide the first linearly polarized light to the first image modulation element side, and transmit second linearly polarized light of the first color light so as to guide the second linearly polarized light to the second image modulation element side;

a polarizing beam splitter that is arranged between the first color separation element and the image modulation elements; and an illumination optical system in which light from the light source is incident on the first color separation element, wherein S polarized light beams are incident on the polarizing beam splitter, wherein, in either a light path from the first color separation element to the first image modulation element or a light path from the first color separation element to the second image modulation element, a polarizing plate is arranged which absorbs or reflects unnecessary polarized light of either the first linearly polarized light or the second linearly polarized light, and in the other light path, a polarizing plate is not arranged, and wherein, if a cross-section including a normal line of a polarization splitting surface of the polarizing beam splitter and a normal line of the first image modulation element is a first cross-section, and a cross-section that is parallel to the normal line of the first image modulation element and perpendicular to the first cross-section is a second cross-section, an F number of the illumination optical system for the first cross-section is larger than the F number of the illumination optical system for the second cross-section.

16. An image projection apparatus configured to guide light from a light source to a first and a second image modulation elements and to project light modulated by the first and second image modulation elements towards an image plane, the image projection apparatus comprising:

a first color separation element configured to reflect first linearly polarized light of a first color light so as to guide the first linearly polarized light to the first image modulation element side, and transmit second linearly polarized light of the first color light so as to guide the second linearly polarized light to the second image modulation element side, wherein, in either a light path from the first color separation element to the first image modulation element or a light path from the first color separation element to the second image modulation element, a polarizing plate is arranged which absorbs or reflects unnecessary polarized light of either the first linearly polarized light or the second linearly polarized light, and in the other light path, a polarizing plate is not arranged, wherein the first color separation element has properties that transmit P polarized light beams in a green band and reflect P polarized light beams in a blue and a red band and S polarized light beams, and wherein the polarizing plate is configured to analyze the P polarized light beams in the blue and red bands reflected by the first color separation element.

17. An image projection apparatus configured to guide light from a light source to a first and a second image modulation elements and to project light modulated by the first and second image modulation elements towards an image plane, the image projection apparatus comprising:

a first color separation element configured to reflect first linearly polarized light of a first color light so as to guide the first linearly polarized light to the first image modulation element side, and transmit second linearly polarized light of the first color light so as to guide the second linearly polarized light to the second image modulation element side; and a second color separation element configured to split the second color light into a third color light and a fourth color light, wherein, in either a light path from the first color separation element to the first image modulation element or a light path from the first color separation element to the second image modulation element, a polarizing plate is arranged which absorbs or reflects unnecessary polarized light of either the first linearly polarized light or the second linearly polarized light, and in the other light path, a polarizing plate is not arranged, wherein the second color separation element is configured to reflect the first linearly polarized light of the third color light, and to transmit the second linearly polarized light of the first color light, the second linearly polarized light of the third color light, and the second linearly polarized light of the fourth color light, and wherein the polarizing plate is configured to analyze the second linearly polarized light transmitted through the second color separation element.

* * * * *